US011176813B2

(12) United States Patent
Rakshit et al.

(10) Patent No.: US 11,176,813 B2
(45) Date of Patent: Nov. 16, 2021

(54) PATH DEVIATION DETECTION ANALYSIS BY PATTERN RECOGNITION ON SURFACES VIA MACHINE LEARNING

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/514,310

(22) Filed: Jul. 17, 2019

(65) Prior Publication Data

US 2021/0020033 A1    Jan. 21, 2021

(51) Int. Cl.
| | | |
|---|---|---|
| *G08G 1/01* | (2006.01) | |
| *G05B 13/02* | (2006.01) | |
| *G05D 1/02* | (2020.01) | |
| *G05D 1/00* | (2006.01) | |
| *G08G 3/00* | (2006.01) | |

(52) U.S. Cl.
CPC ....... *G08G 1/0125* (2013.01); *G05B 13/0265* (2013.01); *G05D 1/0088* (2013.01); *G05D 1/0291* (2013.01); *G08G 1/0145* (2013.01); *G08G 3/00* (2013.01)

(58) Field of Classification Search
CPC .......... G08G 1/00; G08G 1/01; G08G 1/0104; G08G 1/0125; G08G 1/0145; G08G 3/00; G05B 13/00; G05B 13/02; G05B 13/0265; G05D 1/00; G05D 1/0088; G05D 1/02; G05D 1/021; G05D 1/0287; G05D 1/0291

See application file for complete search history.

(56) References Cited

U.S. PATENT DOCUMENTS

| | | |
|---|---|---|
| 7,310,450 B2 | 12/2007 | Steinberg |
| 8,871,030 B2 | 10/2014 | Chen |
| 9,603,499 B2 | 3/2017 | Friedman |
| 9,974,422 B2 | 5/2018 | Lee |
| 10,244,913 B2 | 4/2019 | Schnittman |

(Continued)

OTHER PUBLICATIONS

Ramalingam et al., "Cascaded Machine-Learning Technique for Debris Classification in Floor-Cleaning Robot Application", MDPI, Appl. Sci 2018, 8 2649: doi:103390/122649. Published Dec. 17, 2018, 19 pages.

(Continued)

*Primary Examiner* — Geepy Pe
*Assistant Examiner* — Michael Allen Brace, Jr.
(74) *Attorney, Agent, or Firm* — Monchai Chuaychoo

(57) ABSTRACT

An approach for analyzing and predicting a pattern of debris accumulation in area based on a deviation in mobility pattern. The approach includes receiving data from one or more sensors from an area and identifying objects based on the received data. The approach determines whether the received data is a first instance and stores the data. Based on the stored data, the approach analyzes, via machine learning, a mobility pattern associated with the retrieved data. Furthermore, the approach generates an actionable task list based on the analyzed data and instructs one or more computing devices based on the actionable task list.

20 Claims, 6 Drawing Sheets

(56) References Cited

U.S. PATENT DOCUMENTS

| | | | | |
|---|---|---|---|---|
| 10,463,217 | B1* | 11/2019 | Bialek | A47L 9/2821 |
| 2015/0148953 | A1* | 5/2015 | Laurent | G06N 20/10 |
| | | | | 700/250 |
| 2016/0088993 | A1 | 3/2016 | Chuang | |
| 2017/0360269 | A1* | 12/2017 | Chao | A47L 11/24 |
| 2018/0147721 | A1* | 5/2018 | Griffin | A47L 11/4011 |
| 2018/0344116 | A1 | 12/2018 | Schriesheim | |
| 2018/0353044 | A1 | 12/2018 | Erkek | |
| 2019/0011912 | A1* | 1/2019 | Lockwood | G05D 1/0231 |
| 2019/0082918 | A1 | 3/2019 | Koetz | |
| 2019/0154451 | A1* | 5/2019 | Nystrom | G06F 16/29 |
| 2019/0176321 | A1* | 6/2019 | Afrouzi | G05D 1/0044 |
| 2019/0176333 | A1* | 6/2019 | Hager, IV | G06T 17/05 |
| 2019/0204851 | A1* | 7/2019 | Afrouzi | A47L 9/2852 |
| 2019/0220011 | A1* | 7/2019 | Della Penna | G06F 8/65 |
| 2019/0224850 | A1* | 7/2019 | Honeck | G06K 9/00664 |
| 2020/0009732 | A1* | 1/2020 | Gordon | G05D 1/0055 |
| 2020/0100639 | A1* | 4/2020 | Ullmann | B25J 11/0085 |
| 2020/0333789 | A1* | 10/2020 | Suzuki | G01S 17/89 |
| 2021/0078172 | A1* | 3/2021 | Cao | G06F 3/04847 |

OTHER PUBLICATIONS

"AI microscopes for the ocean", IBM Research, downloaded from the internet on May 24, 2021, 5 pages, <https://web.archive.org/web/20200726174532/https://www.research.ibm.com/5-in-5/ai-microscope/>.

"Build smarter mobile services and apps", IBM, downloaded from the internet on May 24, 2021, 4 pages, <https://www.ibm.com/cloud/mobile>.

"Cleaning Up The Garbage Patches", The Ocean Cleanup, 10 pages, <https://theoceancleanup.com/oceans/>.

"IBM Streams", IBM, downloaded from the internet on May 24, 2021, 5 pages, <https://www.ibm.com/cloud/streaming-analytics>.

"IBM Watson Machine Learning", IBM, downloaded from the internet on May 24, 2021, 14 pages, <https://www.ibm.com/cloud/machine-learning>.

"Internet of Things (IoT) on IBM Cloud", IBM, downloaded from the internet on May 24, 2021, 10 pages, <https://www.ibm.com/cloud/internet-of-things>.

Abrams, Michael, "Remote Robot Cleans Trash from Water", The American Society of Mechanical Engineers (ASME), May 16, 2018, 4 pages, <https://www.asme.org/topics-resources/content/remote-robot-cleans-trash-water>.

Agrawal et al., "Aquatic Multi-Robot System for Lake Cleaning", Proceedings of the 16th International Conference on Climbing and Walking Robots and the Support Technologies for Mobile Machines, Aug. 2013, DOI:10.1142/9789814525534_0024, 6 pages.

Cordis, "Robots designed to clean up our streets", Phys.org, May 1, 2013, 2 pages, <https://phys.org/news/2013-05-robots-streets.html>.

Curcio, Katharine, "Robots: The Future of Cleaning?", Services Magazine, downloaded from the internet on May 24, 2021, 6 pages, <https://servicesmag.org/online-digital-magazine/digital-archives/item/291-robots-the-future-of-cleaning>.

Fingas, Roger, "Here are five of the best iPhone-connected robot vacuums", AppleInsider, Aug. 22, 2018, 13 pages, <https://appleinsider.com/articles/18/08/22/here-are-five-of-the-best-iphone-connected-robot-vacuums>.

Jeon et al., "Autonomous Robotic Street Sweeping: Initial Attempt for Curbside Sweeping", 2017 IEEE International Conference on Consumer Electronics (ICCE), 2 pages.

* cited by examiner

PATH DEVIATION DETECTION ANALYSIS BY PATTERN RECOGNITION ON SURFACES VIA MACHINE LEARNING

BACKGROUND

The present invention relates generally to the field of safety, and more particularly to leverage AI (Artificial Intelligence) to detect deviation in a path.

Many building and structures are constructed with multiple levels with floors based on the activity of the occupants. Some floors are treated with special materials to protect (i.e., dust resistance) the surface. Floor cleaning can be an essential function to prevent injuries and also to remove dirt. For example, an accumulation of dirt and grease in a restaurant can cause an occupant to slip and fall.

Similarly, surface and waterway navigation can become quite cumbersome to navigate due to debris and obstacles. For example, debris such as logs and trash on water way can cause damage to propeller of boats and pumps if the vessel do not have the ability to detect and avoid those obstacles. Additionally, debris such as dirt, dust, etc. accumulated on surface of roadways may become a navigation hazard and may cause motorist injury and damage the vehicle.

SUMMARY

Embodiments of the present invention disclose a computer-implemented method, computer program product and a computer system for detecting and predicting a mobility pattern. The computer-implemented method may be receiving data from one or more sensors from an area; identifying objects based on the received data; determining whether the received data is a first instance; responsive to determining that the received data is not the first instance, analyzing, via machine learning, a mobility pattern associated with the retrieved data; generating an actionable task list based on the analyzed data, wherein the analyzed data comprises a deviation in the mobility pattern; and instructing one or more computing devices based on the actionable task list.

The computer program product may include one or more computer readable storage media and program instructions stored on the one or more computer readable storage media, the program instructions comprising: program instructions to receive data from one or more sensors from an area; program instructions to identify objects based on the received data; program instructions to determine whether the received data is a first instance; responsive to determining that the received data is not the first instance, program instructions to analyze, via machine learning, a mobility pattern associated with the retrieved data; program instructions to generate an actionable task list based on the analyzed data, wherein the analyzed data comprises a deviation in the mobility pattern; and program instructions to instruct one or more computing devices based on the actionable task list.

The computer system may include one or more computer processors; one or more computer readable storage media; program instructions stored on the one or more computer readable storage media for execution by at least one of the one or more computer processors, the program instructions comprising: program instructions to receive data from one or more sensors from an area; program instructions to identify objects based on the received data; program instructions to determine whether the received data is a first instance; responsive to determining that the received data is not the first instance, program instructions to analyze, via machine learning, a mobility pattern associated with the retrieved data; program instructions to generate an actionable task list based on the analyzed data, wherein the analyzed data comprises a deviation in the mobility pattern; and program instructions to instruct one or more computing devices based on the actionable task list.

DETAILED DESCRIPTION

Figure 1:
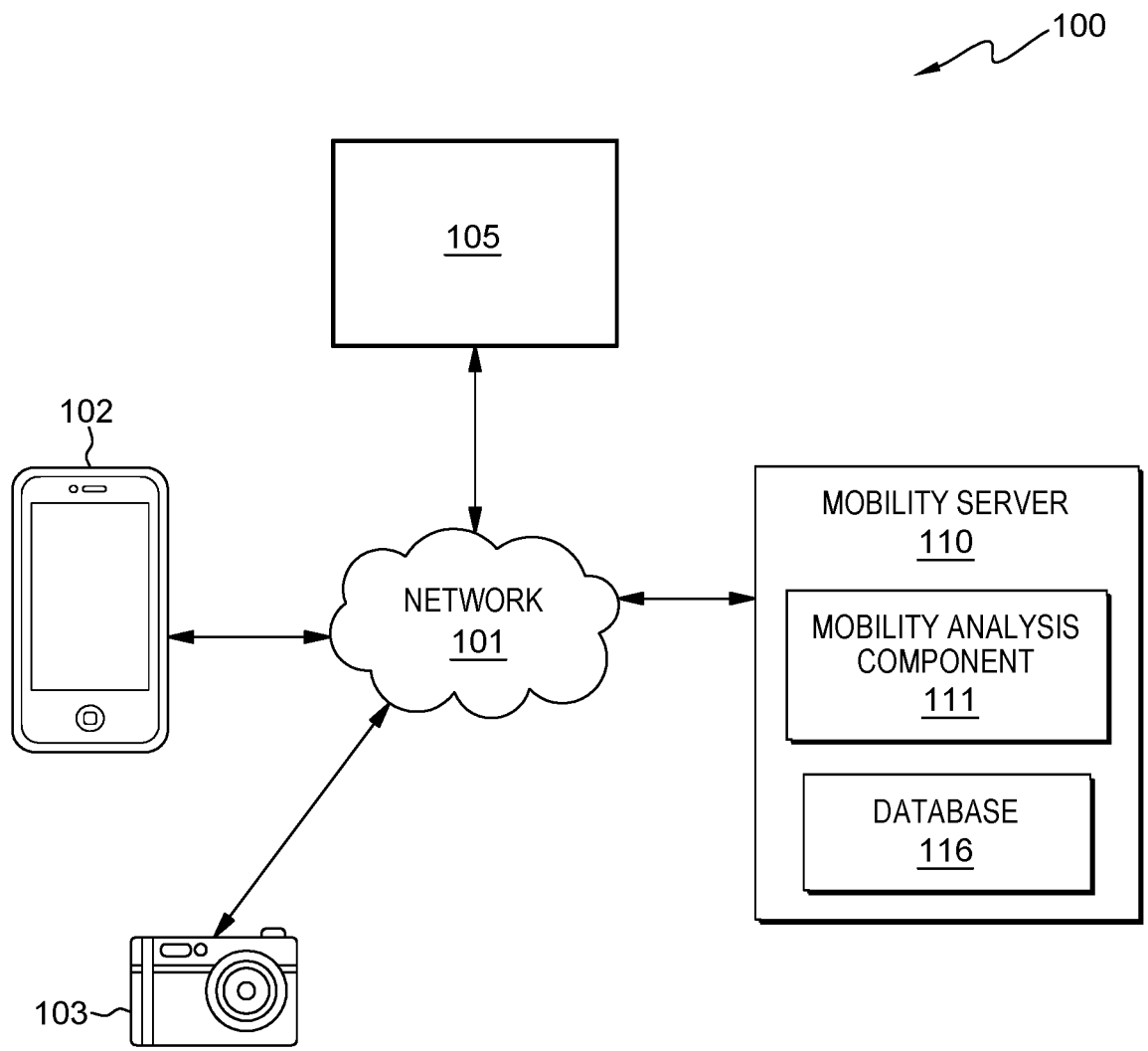
FIG. 1 is a functional block diagram illustrating a topology of a path mobility detection environment, designated as 100, in accordance with an embodiment of the present invention.

Embodiments of the present invention provides an efficient and intelligent approach of detecting (e.g., via IoT camera, etc.) obstacles and hazards on various surfaces (e.g., roadways, water ways, floors, etc.) by leveraging video analysis based on deviation in a mobility/traffic pattern (e.g., human foot pattern, car movement pattern, etc.). For example, illustrating with a use case within a manufacturing facility, the system (via machine learning) observes a normal pattern of the robotic cleaning device and a normal foot traffic of factory workers. However, the system detects an altered mobility pattern based on the dust and debris accumulation pattern from the robotic cleaning device mobility pattern deviation or based on the new human foot traffic pattern. Embodiments recognize that pathways may be created to minimize risks or dangers to individuals or property, such as, but is not limited to, vehicles. For example, a main pathway is created to avoid areas in a workshop that may pose an increased risk of injury to workers. Embodiments recognize that there may be a variety of reasons why a mobility pattern deviation can occur. For example, an object can obstruct a pathway and result in a deviation of foot-traffic around the object. In some situations, such a mobility pattern deviation may result in a scenario in which there is an increased risk of injury to individuals. A comparison of the normal pattern with altered pattern can determine the deviation in a specific area. Thus, the system can determine, based on the deviation in the mobility pattern, that someone may have left a pallet within a normal traffic pattern that could be an obstacle or hazard to movement of people or goods being transported. Additionally, video data of the deviation area can be analyzed with image analytics to determine the source object type causing the deviation. The system can send instructions to mechanized mobile computing devices, e.g., robots, to cause the mechanized device to investigate the source object if video analysis is unable to recognize the source object.

Some embodiment can observe, via machine learning, an area and over a period. The system can correlate the dust spreading and dust accumulation pattern (based on the observation of the area) in addition to the speed and the direction of movement associated with a mobility pattern (e.g., humans, cars, etc.) in that same area and can predict future activities. For example, continuing with a use case scenario with the manufacturing facility, a typical dust/debris accumulation for an area is five kilograms per day. The system only requires one cleaning robot to handle the area. Additionally, the debris pattern is usually congregated around one area in the morning. However, the system has observed, over a course of several days, an increase in debris volume and an increase in foot pattern towards the raw materials area. Thus, the system can infer that this increase in volume of debris will continue and can send more cleaning robots to handle this new pattern.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating a topology of a path mobility environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Path mobility detection environment 100 includes mobile device 102, IOT devices 103, robot 105 and detection server 110. All (e.g., 102, 103, 105 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between detection server 110 and other computing devices (not shown) within path mobility detection environment 100. It is noted that other computing devices can include, but is not limited to, robot 105 and any electromechanical devices capable of carrying out a series of computing instructions.

Mobile device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with server computers (e.g., detection server 110) via network 101, in accordance with an embodiment of the present invention.

IoT devices 103 is an IoT (Internet of Things) device such as, but is not limited to, smart camera, monitor and sensors.

Robot 105 is a machine that is capable of carrying out a series of actions automatically. Robot 105 can be an autonomous machine or can be controlled by a human operator. Robot 105 can be equipped with various sensors (e.g., camera, radar, proximity, etc.) which can be used for navigation and/or collection information from the surrounding environment. Furthermore, robot 105 can be cleaning robot or a security robot/drone (i.e., police/law enforcement).

Detection server 110 can be a standalone computing device, a management server, a web server, a mobile computing device, or any other electronic device or computing system capable of receiving, sending, and processing data. In other embodiments, path mobility detection server 110 can represent a server computing system utilizing multiple computers as a server system, such as in a cloud computing environment. In another embodiment, path mobility detection server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, detection server 110 represents a computing system utilizing clustered computers and components (e.g., database server computers, application server computers, etc.) that act as a single pool of seamless resources when accessed within path mobility detection environment 100.

Path mobility detection server 110 includes detection component 111 and database 116.

Detection component 111 enables the present invention to capture the environment via sensors, analyze and learn the mobility pattern based on the captured data and predict future mobility pattern. Detection component 111 will be described in greater details in regard to FIG. 2.

Database 116 is a repository for data used by mobility analysis component 111. Database 116 can be implemented with any type of storage device capable of storing data and configuration files that can be accessed and utilized by detection server 110, such as a database server, a hard disk drive, or a flash memory. Database 116 uses one or more of a plurality of techniques known in the art to store a plurality of information. In the depicted embodiment, database 116 resides on detection server 110. In another embodiment, database 116 may reside elsewhere within path mobility detection environment 100, provided that detection component 111 has access to database 116. Database 116 may store information associated with, but is not limited to, corpus knowledge of dust pattern/accumulation, typical pedestrian gait/walking pattern and vehicle navigation pattern (e.g., boats, cars, robotic carts, etc.).

Figure 2A:
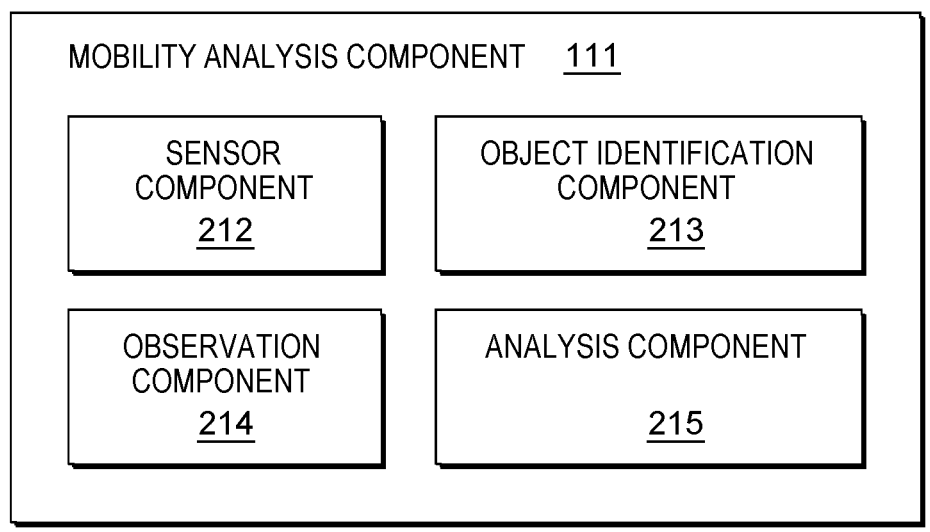
FIG. 2A is a functional block diagram illustrating detection component in accordance with an embodiment of the present invention.

FIG. 2A is a functional block diagram illustrating detection component 111 in accordance with an embodiment of the present invention. In the depicted embodiment, detection component 111 includes sensor component 212, object identification component 213, observation component 214 and analysis component 215.

As is further described herein below, sensor component 212, of the present invention provides the capability of communicating to various sensors (e.g., cameras, temperature, location, pressure, etc.) embedded in mobile devices 102, IoT devices 103 and robot 105 located in the path mobility detection environment 100. Additionally, sensor component 212 can access and retrieve data associated with the previous mentioned sensors. For example, robot 105, an autonomous cleaning robot equipped with a camera vision system, is cleaning a certain area of a factory floor between each work shift (i.e., every 4 hours for 20 mins). The sensor data of robot 105 is transmitted to sensor component 212. The sensor data can include, but it is not limited to, location of robot, cleaning time, amount and type of dust/dirt/debris picked up. In another example of the same factory floor, there is a video camera (i.e., IoT device 103), aimed at the same location where robot 105 is assigned. The footage of the factory floor from the video camera can also be utilized by sensor component 212. Furthermore, sensor component 212 may store data in database 116. And sensor component 212 can instruct robot 105 to clean/investigate a particular area.

As is further described herein below, object identification component 213, of the present invention provides the capability of detecting and identifying object from sensor component 212. Sensor component 212 contains information related to various sensors. Using existing techniques known in the art of object identification based on video/graphics analysis (e.g., Mixture of Gaussian models, Wavlet decomposition, etc.), object identification component 213 can identify the following, but it is not limited to, footprints, tire prints, animal tracks, debris, dust/dirt, floor surfaces, roadway surfaces, waterway surfaces, plants, building, standing water/liquid accumulation, pedestrians, vehicles and manmade objects. For example, referring to the previous mentioned factory floor, object identification component 213 is able to identify dust accumulation on the factory floor, footprints made by the factory workers and track prints made by the four wheel cart used by the factory worker to carry tools and parts from one area to another.

As is further described herein below, observation component 214 of the present invention provides the capability accumulating the collected data from sensor component 212 and object identification component 213. And based on the collected data, observation component 214 can build a corpus of knowledge of the areas being tracked/observed. For example, a corpus can include knowledge relating to dust accumulation and spread pattern of a given area. Dust spread and accumulation patterns can be dependent on various factors such as the position of obstacles, intersecting pattern of debris, distance between debris and a pathway, wind flow direction, walking footprint, frequency of cleaning the floor, number of people movement around that area, movement of physical items, like trolley, activity performed, etc.

As is further described herein below, analysis component 215 of the present invention provides the capability of determining, through AI (Artificial Intelligence) and/or machine learning, the movements (i.e., mobility pattern) of people and objects through a given area. Furthermore, analysis component 215 can predict/deduce the timeframe a human or object mobility pattern has occurred in a given dust accumulation area. It is noted that mobility pattern, through dust accumulation, can be identified and tracked by analyzing the dust spread and traffic pattern on the floor. The dust pattern, observed through machine learning, can be used to predict, by analysis component 215, the type of activity that occurred within the area. For example, referring to FIG. 2B kitchen floor, there are foot traffic pattern 220 that has been created by occupants of a house. A video camera (i.e., IoT device 103) is aimed at the kitchen floor and is collecting data by the system via sensor component 212. There are other objects (besides dust) on the floor and based on object identification component 213, the camera identifies cake crumbs and cake icing. Additionally, the camera can identify the foot pattern aggregated around table 221. Based on the objects detected and foot traffic pattern, analysis component 215 is able to predict that the activity occurred was a birthday party in the kitchen. It is noted that it may require more than one or more observation by the system to learn about the objects pattern and predict the activity. In some embodiments, analysis component 215 determines whether a given change in a mobility pattern poses an increased hazard. In some embodiments, analysis component 215 determines whether there is an increased hazard based on a type of traffic and characteristics of an area that the new pathway passes through. For example, a boat pathway in a river is obstructed by a tree floating in the water. As such, boats are deviating from the marked pathway and passing through an area that has an undercurrent. Since the undercurrent poses an increased risk to the operators and passengers, since there is an increased danger of drowning in the case of a capsize of the boat, analysis component 215 determine there is an unacceptable increase in hazard as a result of the mobility pattern deviation. In this embodiment and example, analysis component 215 issues warnings to computing devices associated with the boats that are deviating from the marked pathway. For example, analysis component 215 sends text messages to the smart phones of the passengers and crew of a boat indicating the hazard posed by the undercurrent. In a continuation of the above example, analysis component 215 issues instructions to an automated system that initiates a removal process to remove the tree from the water, i.e., removing the obstruction that is causing the deviation. One having ordinary skill in the art understands that many approaches to hazard identification, communications, and removal of the hazard are within the scope of this invention.

In another embodiment, based on observing/learning the dust accumulation and spreading pattern from video analysis, analysis component 215 is able to identify dust air flow, mobility pattern through the area. For example, referring to FIG. 2B, along the path of 220, there are a very small amount of dust accumulation due to the heavy traffic pushing the dust away from the path. Thus, analysis component 215 can conclude that there are larger dust piles (based on accumulation) away from the path and can send cleaning robots towards the area where there is a larger volume of dust/debris.

Another use case will be used to illustrate the ability of analysis component 215 to learn a change in mobility pattern. For example, the traditional traffic pattern on a waterway (e.g., river, lake, ocean port) may cause the accumulation of waste/trash to be distributed to known areas. When there is a deviation in the waste/trash accumulation can be used as basis to analyze change in mobility pattern of boats and robotic devices (e.g., autonomous or non-autonomous) to determine if there is an obstacle or hazard. For example, barges and ferries make frequent trips (10-20 times a day) by traveling up and down a path on the Mississippi river from New Orleans, La. to Baton Rouge, La. The system has observed the typical traffic pattern of the barges and ferries over a span of a few days. However, today, the system has observed a deviation in that waterway traffic from New Orleans to Baton Rouge. The system can infer/deduced that there is an obstacle/hazard along the path based on the deviation of the boat that travels up a water way. The obstacle/hazard can be a disabled boat/barge or can block an area of the waterway preventing normal passage. The system can send one or more robots to investigate and/or even to remove the obstacle. Or the system can relay the information to a human user and await further instructions/decision from the user.

Figure 2B:
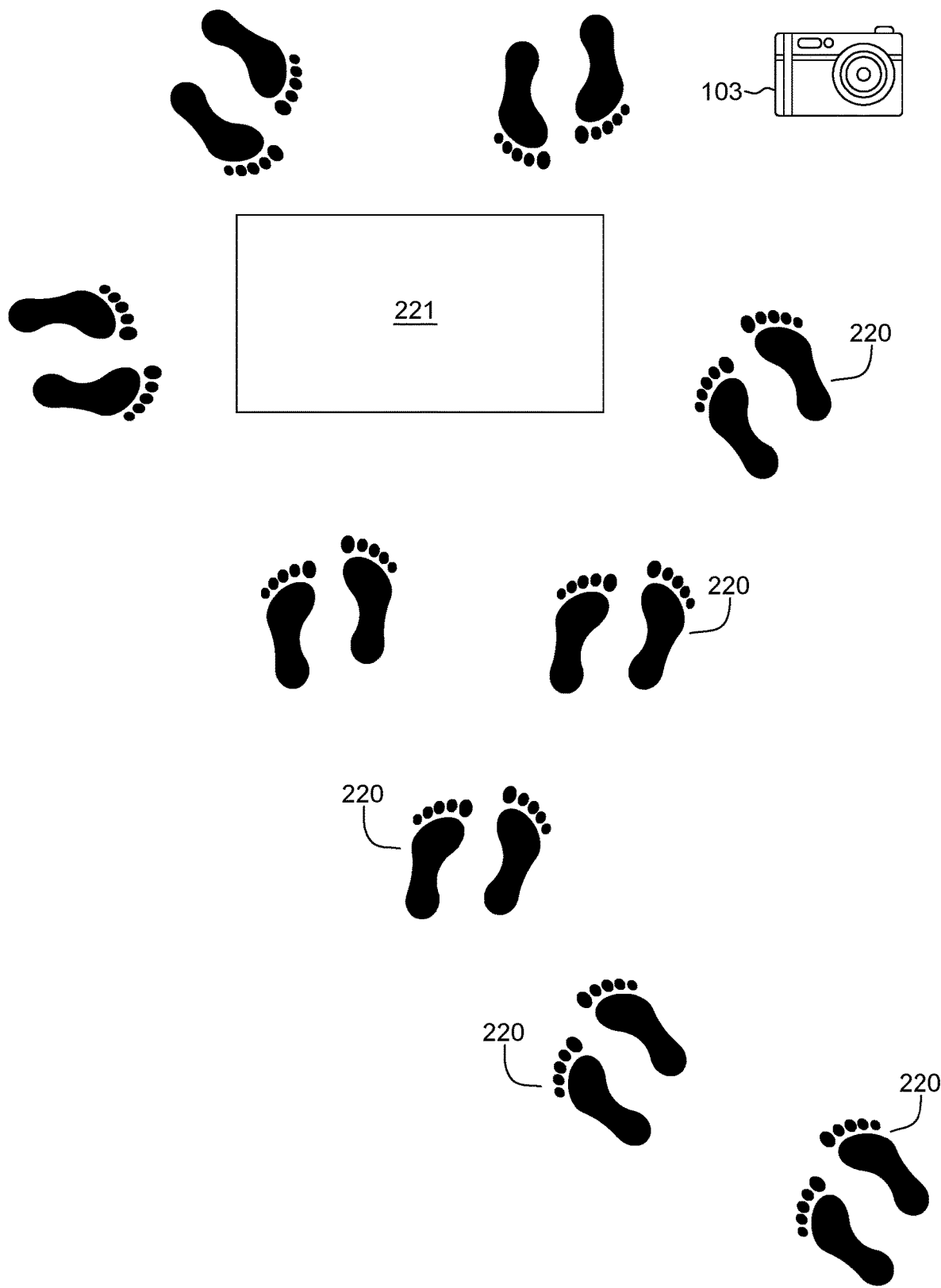
FIG. 2B illustrates a pedestrian foot pattern for a floor of a room in accordance with an embodiment of the present invention.

Referring to FIG. 2B, normally foot pattern 220 is distributed randomly across the kitchen floor. However, referring to FIG. 2C, the newly observed foot pattern 220, distributed along narrow pattern, suggests that obstacle 222 may be impeding normal foot pattern.

Analysis component 215 can mobilize, through sensor component 213, cleaning robots (i.e., robot 105) based on the predicted dust pattern spread and accumulation pattern. For example, dust accumulates on the floor. Based on the position and concentration of the dust on the floor, a cleaning robot identifies the area where it has cleaned and where more cleaning needs to be applied. With the help of cameras (i.e., IoT devices 102) in the environment, the cleaning robot can be instructed by analysis component 215, through sensors component 212, of the need to clean an area.

Another use case will be used to illustrate the functionality of analysis component 215. In another embodiment, the system can leverage existing robotic cleaning devices and as well as other mobile/wearable devices (i.e. smart watches with GPS) within an environment using location awareness within mapping software of the environment can be used to determine mobility pattern to establish baseline. When deviations in the mobility pattern are determined, analysis of video feed from the environment can be used to identify the obstacles or hazards that have altered the mobility pattern. For example, within an airport there may be a set of normal mobility patterns of people with smart phones/wearables, and robotic cleaning devices operating within the mobility pattern in need of continuous cleaning. Someone decides to leave a suitcase in a normal traffic pattern. People and robotic cleaning devices will move around the suitcase and the location awareness of each can be tracked. A suitcase unattended within an airport traffic pattern can be seen as a public safety obstacle or worse concern as a security threat. The deviation in the mobility pattern can be used as basis to then perform image analytics on the video feed at the location of deviation in the mobility pattern to identify the object, evaluate risk of object (i.e., suitcase vs food bag), determine how long it has been unattended, etc. and take the appropriate action accordingly (e.g., dispatching robotic cleaning of food bag, or direct airport security to suitcase).

FIG. 2B illustrates a typical pedestrian foot pattern for a floor of a room in accordance with an embodiment of the present invention. Foot pattern 220 is based on human traffic pattern in a kitchen floor. Typically, foot pattern 220 follows an orderly path from the entrance and move towards table 221. Additionally, foot pattern 220 congregates around table 221 and more debris is accumulated (e.g., food particles) around table 221.

Figure 2C:
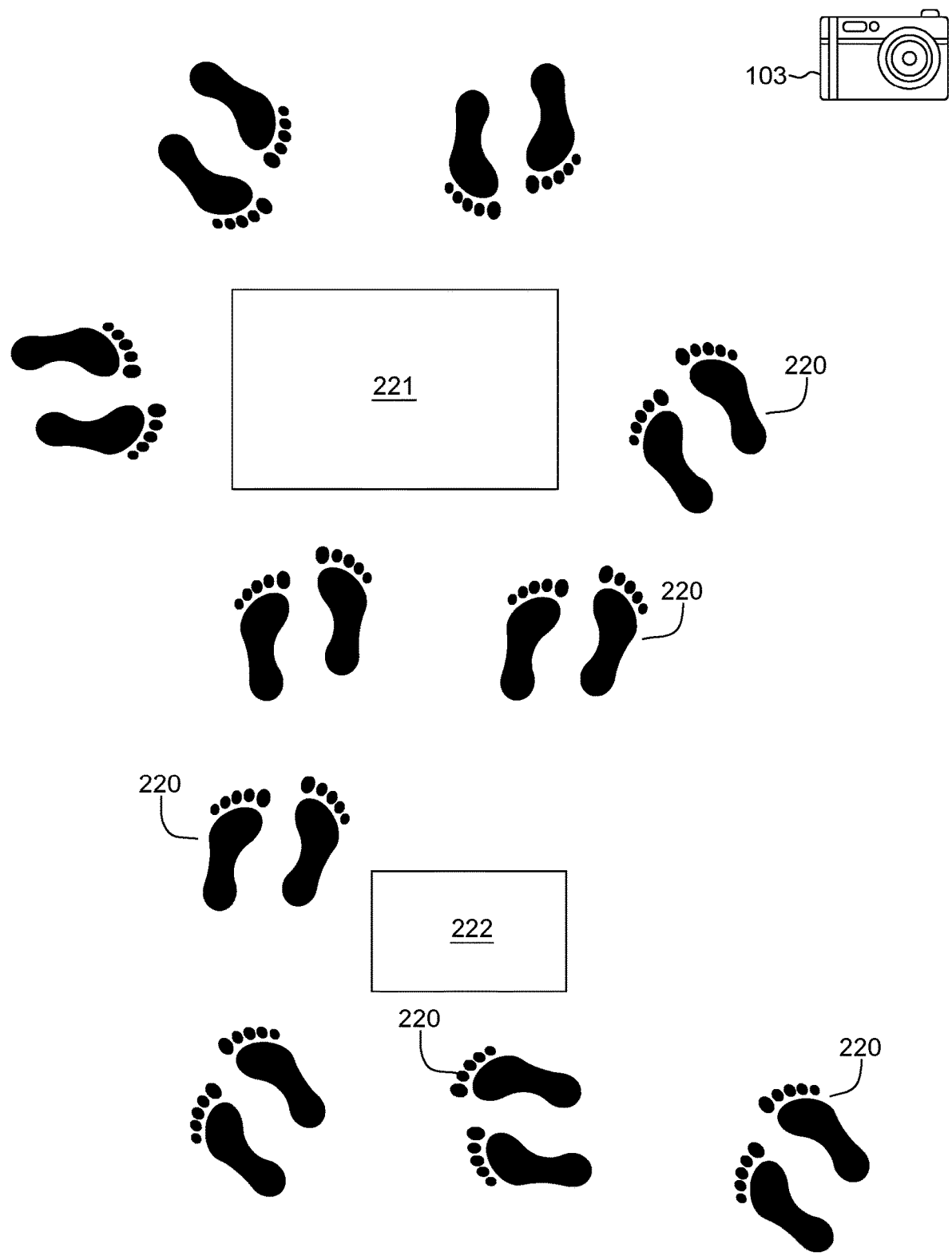
FIG. 2C illustrates an altered pedestrian foot pattern based on an obstacle for a floor of a room in accordance with an embodiment of the present invention.

FIG. 2C illustrates an altered pedestrian foot pattern based on an obstacle for a floor of a room in accordance with an embodiment of the present invention. As previously mentioned in FIG. 2B, foot pattern 220 follows a normal pattern from the door towards table 221. However, due to obstacle 222, there is a deviation in foot pattern 220 towards table 221.

Figure 3:
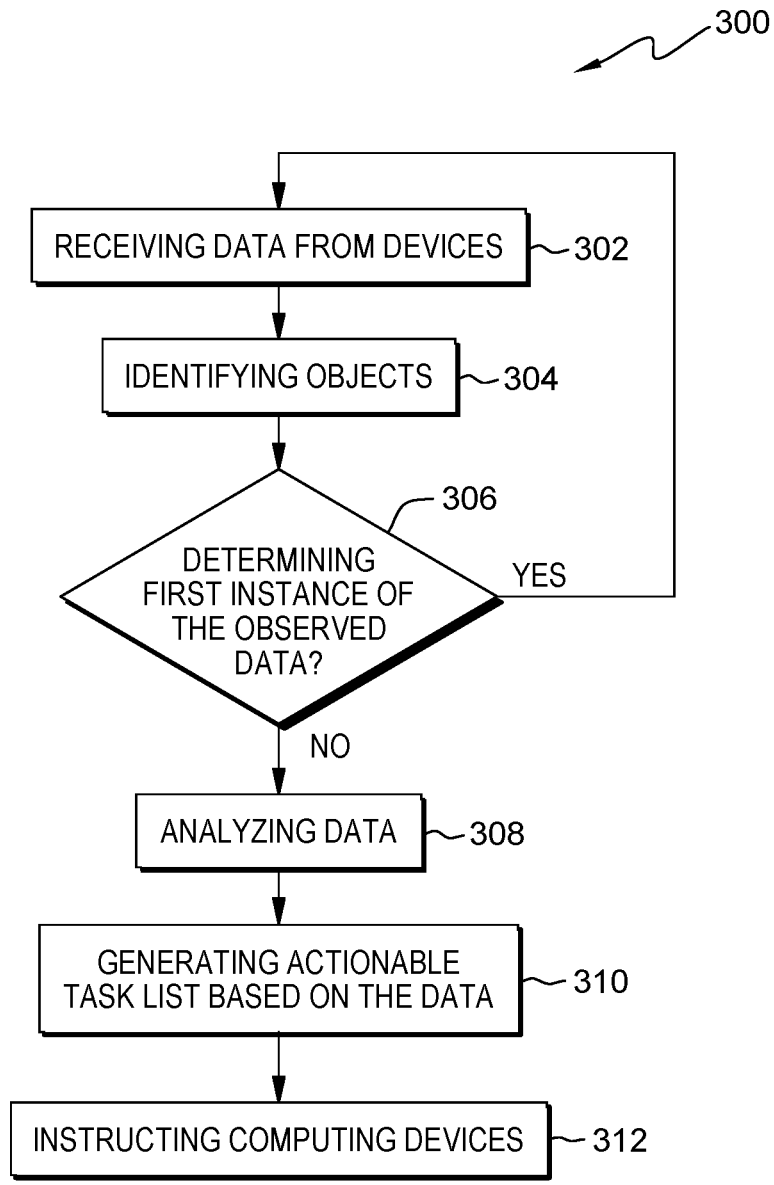
FIG. 3 is a flowchart illustrating the operation of a path mobility system, designated as 300, in accordance with an embodiment of the present invention.

FIG. 3 is a flowchart illustrating the operation of a path mobility detection environment 100, designated as 300, in accordance with an embodiment of the present invention.

Mobility analysis component 111 receives data from devices (step 302). In an embodiment, mobility analysis component 111 through sensor component 212 retrieves video data from devices (e.g., mobile device 102, IoT device 103, robot 105). The system can begin the startup process by gathering data (e.g., visual, location via GPS, etc.) from available devices. For example, referring to FIG. 2B, the system retrieved video data from IoT device 103.

Mobility analysis component 111 identifies the objects (step 304). In an embodiment, mobility analysis component 111 through object identification component 212 determines the object in the video from the retrieved data. For example, referring to FIG. 2B, the system can identify human footprints (i.e., 220) along with dust and debris on the kitchen floor. It is noted that existing techniques (e.g., Mixture of Gaussian models, Wavlet decomposition, etc.) can be used to identified objects from video and/or still images.

Mobility analysis component 111 determines the first instance of the observed data (decision block 306). In an embodiment, mobility analysis component 111 determines whether the identified objects based on the retrieved data is the first observed object. If the system that the objects identified is the new ("YES" branch, decision block 306) then the system will store the data for future analysis and return to step 302 (i.e., gather more data for observation component 214). However, if the system has previously detected the object before (e.g., have a historical record, corpus knowledge, etc.) then ("NO" branch, decision block 306) the system proceeds to analyze the observed pattern (step 308). For example, referring to FIG. 2B, during the initial start of the system, it has identified various feet pattern on the kitchen floor (i.e. to the system, it seems randomly placed). However, the system does not have any historical knowledge of a typical feet pattern in the area. Thus, the system would need to observe over a period (using observation component 214) to understand the typical pattern for that particular area.

Mobility analysis component 111 analyzes data (step 308). In an embodiment, mobility analysis component 111 through analysis component 215 begins analyzing the observe data and output the result of the data. For example, referring to FIG. 2C, the system has determined (based on deviation in mobility pattern) that an obstacle/hazard (i.e., obstacle 221) exists on the kitchen floor.

Mobility analysis component 111 generates actionable task list (step 310). In an embodiment, mobility analysis component 111 through analysis component 215 generate an actionable task list based on the result of the data. An actionable task list can include, but is not limited to, set of instructions for computing devices (i.e., robot 105) to investigate the debris accumulation and another set of instructions for computing devices (i.e., robot 105) to clean the debris accumulation. For example, referring to FIG. 2C, the system can generate the actionable task list along with the result to a user (via mobile alert or email) or it can send the output (i.e., actionable task list) to a smart home automation control system (not show in environment 100).

Mobility analysis component 111 instructs computing devices (step 312). In an embodiment, based on the previous step of determining a deviation in a mobility pattern, mobility analysis component 111 can send robotic drone(s) to investigate the possible hazard/obstacle based on the actionable task list. For example, referring to FIG. 2C, the system sends a cleaning robot (equipped with cleaning apparatus and video cameras) to investigate the obstacle. The cleaning robot has detected a banana peel (i.e., 221) and is able to remove the slip hazard from the kitchen floor.

The present invention may be a system, a method, and/or a computer program product. The computer program product may include a computer readable storage medium (or media) having computer readable program instructions thereon for causing a processor to carry out aspects of the present invention.

Figure 4:
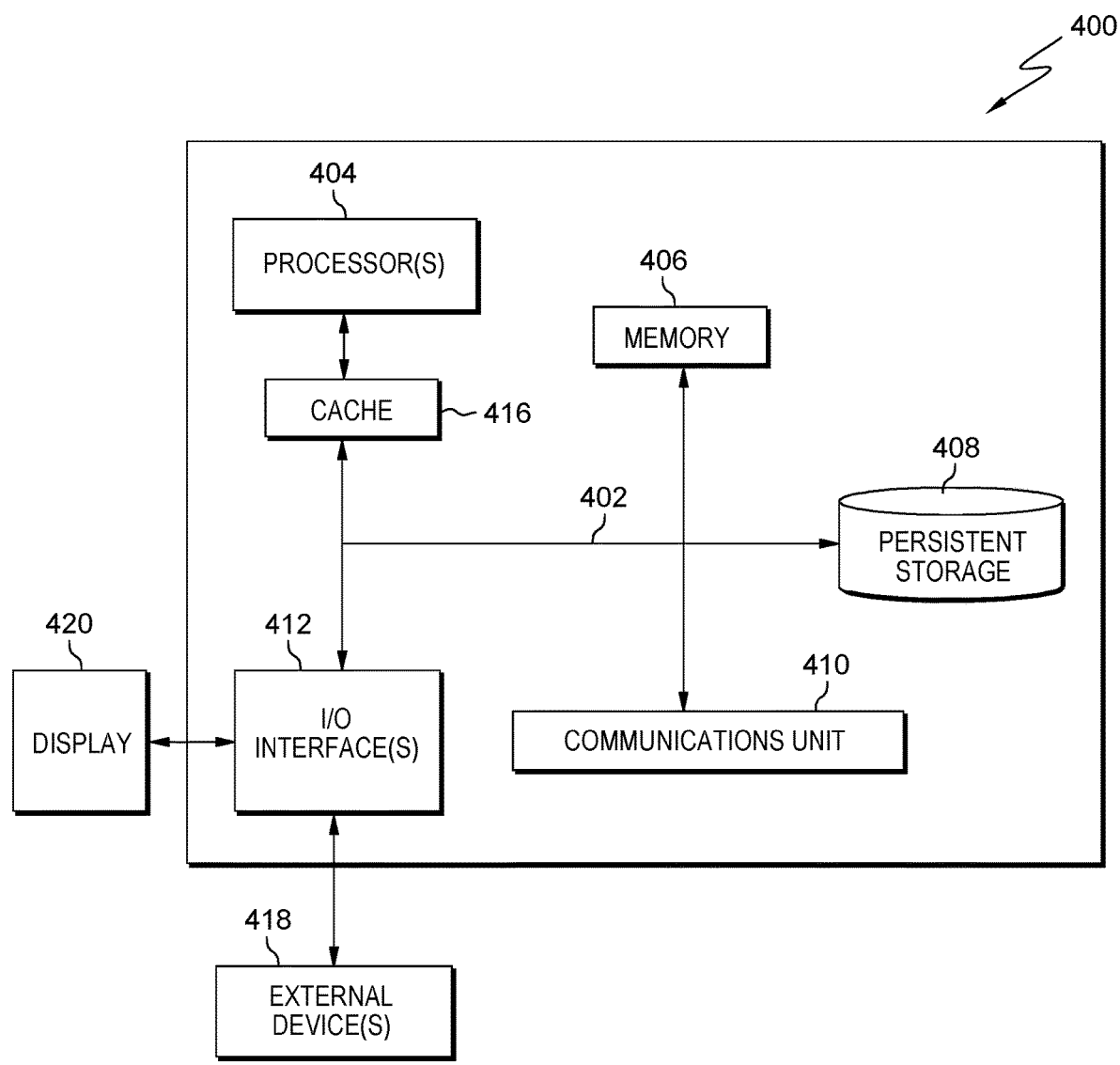
FIG. 4 depicts a block diagram, designated as 400, of components of a server computer capable of executing the detection component system within the path mobility detection environment, of FIG. 1, in accordance with an embodiment of the present invention.

FIG. 4 depicts a block diagram of components of ad intelligence component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for e4ecution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Ad intelligence component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Ad intelligence component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Ad intelligence component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method of detecting and predicting mobility pattern based on debris and removing the debris, the method comprising:
   receiving, by one or more computer processors, data from one or more sensors from an area;
   identifying, by the one or more computer processors, objects based on the data;
   determining, by the one or more computer processors, whether the data is a first instance;
   responsive to determining that the received data is not the first instance, analyzing, by the one or more computer processors, via machine learning, a mobility pattern associated with the data;
   predicting one or more obstacles based on the mobility pattern of the area, wherein the mobility pattern comprises a deviation from a normal path;
   generating, by the one or more computer processors, an actionable task list based on the prediction; and
   instructing, by the one or more computer processors, one or more robotic devices based on the actionable task list; and performing one or more actions based on the actionable task list by the one or more robotic devices.

2. The computer-implemented method of claim 1, wherein the one or more sensors comprises of IoT devices, drones, cleaning robots and mobile computing devices.

3. The computer-implemented method of claim 1, wherein the objects based on the data comprises of pedestrian and vehicle traffic.

4. The computer-implemented method of claim 1, wherein analyzing a mobility pattern associated with the data comprises of, but is not limited to,
   determining, by the one or more computer processors, a pathway for a machine that is to be followed during a removal of the debris from the area;
   determining, by the one or more computer processors, that the pathway intersects a pattern of debris accumulation in the area based, at least in part, on an identification of tracks left in the pattern of debris accumulation; and
   predicting, by the one or more computer processors, an accumulation of debris in the area based, at least in part, on a historical accumulation of debris in the area and on a distance between the pathway and the pattern of debris accumulation.

5. The computer-implemented method of claim 1, wherein generating an actionable task list comprises of investigation of hazards, removing the one or more obstacles, and cleaning of debris.

6. The computer-implemented method of claim 5, wherein instructing one or more computing devices comprises:
   sending, by the one or more computer processors, instructions based on the actionable task list to the one or more robotic devices.

7. The computer-implemented method of claim 1, wherein determining whether the data is a first instance comprising:
   storing, by the one or more computer processors, the data as the first instance;
   storing, by the one or more computer processors, subsequent of the data as a second instance;
   retrieving, by the one or more computer processors, the first instance and the second instance; and
   comparing, by the one or more computer processors, a timestamp and object identification between the first instance and the second instance iteratively until there is a difference in the object identification and the timestamp between the first instance and the second instance.

8. A computer program product for detecting and predicting mobility pattern based on the one or more obstacles and removing the one or more obstacles, the computer program product comprising:
   one or more computer readable storage media and program instructions stored on the one or more computer readable storage media, the program instructions comprising:
   program instructions to receive data from one or more sensors from an area;
   program instructions to identify objects based on the data;
   program instructions to determine whether the data is a first instance;
   responsive to determining that the data is not the first instance, program instructions to analyze, via machine learning, a mobility pattern associated with the data;
   program instructions to predict the one or more obstacles based on the mobility pattern of the area, wherein the mobility pattern comprises a deviation from a normal path;
   program instructions to generate an actionable task list based on the data; and
   program instructions to instruct one or more robotic devices based on the actionable task list; and
   program instructions to perform one or more actions based on the actionable task list by the one or more robotic devices.

9. The computer program product of claim 8, wherein the one or more sensors comprises of IoT devices, drones, cleaning robots, and mobile computing devices.

10. The computer program product of claim 8, wherein the identified objects based on the data comprises of pedestrian and vehicle traffic.

11. The computer program product of claim 8, wherein program instructions to analyze a mobility pattern associated with the data comprises of, but is not limited to,
    program instructions to determine a pathway for a machine that is to be followed during a removal of debris from the area;
    program instructions to determine that the pathway intersects a pattern of debris accumulation in the area based, at least in part, on an identification of tracks left in the pattern of debris accumulation; and
    program instructions to predict an accumulation of debris in the area based, at least in part, on a historical accumulation of debris in the area and on a distance between the pathway and the pattern of debris accumulation.

12. The computer program product of claim 8, wherein program instructions to generate an actionable task list comprises of investigation of hazards, removing the one or more obstacles, and cleaning of debris.

13. The computer program product of claim 8, wherein program instructions to instruct one or more computing devices comprising:
    program instructions to send instructions based on the actionable task list to the computing devices.

14. The computer program product of claim 8, wherein program instructions to determining whether the received data is a first instance comprising:
    program instructions to store the data as the first instance;
    program instructions to store subsequent of the data as a second instance;
    program instructions to retrieve the first instance and the second instance; and
    program instructions to compare a timestamp and object identification between the first instance and the second instance iteratively until there is a difference in the object identification and the timestamp between the first instance and the second instance.

15. A computer system for detecting and predicting mobility pattern based on the one or more obstacles and removing the one or more obstacles, the computer system comprising:
    one or more computer processors;
    one or more computer readable storage media;
    program instructions stored on the one or more computer readable storage media for execution by at least one of the one or more computer processors, the program instructions comprising:
    program instructions to receive data from one or more sensors from an area;
    program instructions to identify objects based on the data;

program instructions to determine whether the data is a first instance;
responsive to determining that the data is not the first instance, program instructions to analyze, via machine learning, a mobility pattern associated with the data;
program instructions to predict the one or more obstacles based on the mobility pattern of the area, wherein the mobility pattern comprises a deviation from a normal path;
program instructions to generate an actionable task list based on the data;
program instructions to instruct one or more robotic devices based on the actionable task list; and
program instructions to perform one or more actions based on the actionable task list by the one or more robotic devices.

16. The computer system of claim 15, wherein the one or more sensors comprises of IoT devices, drones, cleaning robots, and mobile computing devices.

17. The computer system of claim 15, wherein the identified objects based on the data comprises of pedestrian and vehicle traffic.

18. The computer system of claim 15, wherein program instructions to analyze a mobility pattern associated with the data comprises of, but is not limited to,
program instructions to determine a pathway for a machine that is to be followed during a removal of debris from the area;
program instructions to determine that the pathway intersects a pattern of debris accumulation in the area based, at least in part, on an identification of tracks left in the pattern of debris accumulation; and
program instructions to predict an accumulation of debris in the area based, at least in part, on a historical accumulation of debris in the area and on a distance between the pathway and the pattern of debris accumulation.

19. The computer system of claim 15, wherein program instructions to generate an actionable task list comprises of investigation of hazards, removing the one or more obstacles, and cleaning of debris.

20. The computer system of claim 15, wherein program instructions to instruct one or more computing devices comprising:
program instructions to send instructions based on the actionable task list to the computing devices.

* * * * *